US011608156B2

(12) United States Patent
Mino et al.

(10) Patent No.: US 11,608,156 B2
(45) Date of Patent: Mar. 21, 2023

(54) LATERAL ROLLER ASSEMBLIES FOR WING LEADING EDGE SLAT TRACKS

(71) Applicant: EMBRAER S.A., São José dos Campos (BR)

(72) Inventors: Erik Keiti Mino, São Paulo (BR); Luiz Flavio Fernandes, São Paulo (BR); Égon dos Santos Borges, São Paulo (BR); Henrique Fonseca de Araujo, São Paulo (BR)

(73) Assignee: YABORÄ INDÚSTRIA AERONÁUTICA S.A., São José dos Campos (BR)

( * ) Notice: Subject to any disclaimer, the term of this patent is extended or adjusted under 35 U.S.C. 154(b) by 377 days.

(21) Appl. No.: 16/819,589

(22) Filed: Mar. 16, 2020

(65) Prior Publication Data
US 2020/0307768 A1    Oct. 1, 2020

Related U.S. Application Data

(60) Provisional application No. 62/823,942, filed on Mar. 26, 2019.

(51) Int. Cl.
*B64C 9/02* (2006.01)
*B64C 9/22* (2006.01)
*B64C 3/38* (2006.01)

(52) U.S. Cl.
CPC ............... *B64C 9/02* (2013.01); *B64C 9/22* (2013.01); *B64C 3/38* (2013.01)

(58) Field of Classification Search
CPC .... B64C 9/02; B64C 9/04; B64C 9/22; B64C 3/38; B64C 13/28; B64C 13/24; B64C 9/24; Y02T 50/30
See application file for complete search history.

(56) References Cited

U.S. PATENT DOCUMENTS

| | | | | |
|---|---|---|---|---|
| 4,614,382 A * | 9/1986 | Teramachi | .............. | F16C 29/12 384/45 |
| 9,016,636 B2 * | 4/2015 | Parker | ........................ | B64C 9/02 244/214 |
| 10,053,237 B2 * | 8/2018 | Huang | ............... | B64D 45/0005 |
| 11,286,033 B2 * | 3/2022 | Lorenz | ...................... | B64C 9/24 |
| 2009/0127402 A1 * | 5/2009 | Jaggard | ..................... | B64C 9/24 244/213 |
| 2011/0038576 A1 * | 2/2011 | Thornton | .............. | F16C 23/043 384/476 |
| 2016/0083081 A1 * | 3/2016 | Cowles, Jr. | ............. | F16C 17/10 384/570 |
| 2017/0334582 A1 * | 11/2017 | Huang | ...................... | B64C 9/00 |
| 2018/0141637 A1 * | 5/2018 | Schlipf | ..................... | B64C 9/22 |

* cited by examiner

*Primary Examiner* — Assres H Woldemaryam
(74) *Attorney, Agent, or Firm* — Nixon & Vanderhye P.C.

(57) ABSTRACT

A slat track roller assembly is provided so as to mount a slat track operatively associated with a wing leading edge slat for movements between retracted and deployed conditions relative to a leading edge of an aircraft wing. The slat track roller assembly may include at least forward and aft pairs of roller mechanisms connected to a respective one of opposed wing ribs of the wing leading edge in operatively rolling contact with a respective opposed lateral edge of the slat track. At least one of the roller mechanisms is positionally adjustable relative to the respectively opposed lateral edge of the slat track so as to compensate for mechanical tolerances that may be present.

17 Claims, 6 Drawing Sheets

LATERAL ROLLER ASSEMBLIES FOR WING LEADING EDGE SLAT TRACKS

CROSS-REFERENCE TO RELATED APPLICATION

This application is based on and claims domestic priority benefits of U.S. Provisional Application Ser. No. 62/823,942 filed on Mar. 26, 2019, the entire contents of each of which are expressly incorporated hereinto by reference.

FIELD

The embodiments disclosed herein relate generally to aircraft wings having wing leading edge slats. More specifically, the embodiments disclosed herein relate to latter roller assemblies for slat tracks associated with such wing leading edge slats.

BACKGROUND

The wing leading edge slat is a movable high-lift aerodynamic surface located forwarding of the wing leading edge. Most modern transport category aircraft can include, for example, between eight and twelve slat panels that are deployed when needed (e.g., during landing and take-off operations) to increase lift of the wings. It is common to use movable arcuate slat tracks attached to the individual slat panels as a mechanism to extend the slat panels between their retracted and deployed conditions relative to the wing leading edge, with each slat panel moving around an artificial axis located at the center of the slat track radius. The actuation of the slat tracks is typically accomplished by a gear coupling between the track and a pinion on each track station which is is driven by torque tubes connected to an electric motor located in the aircraft's fuselage. Each slat track is typically supported by two pairs of lateral rollers located in the inboard and outboard leading edge rib to absorb the lateral loads and to smoothly guide the slat track during movement.

Most modern aircraft possess a decreased wing thickness so as to reduce induced drag. Less drag will of course translate into more efficient aircraft performance and less fuel is consumption during aircraft missions. However, a reduction of wing thickness causes a problem for the allocation of space to position all the components for the wing slat mechanisms, including the lateral roller supports.

Certain conventional designs for lateral roller supports uses two bolts to attach and eliminate the rotation of the support in the wing leading edge ribs, with the two bolts being located in opposite directions regarding the center plane of the support. The application of this conventional design however requires more free area on the leading edge ribs due to the attachment bolts. Additionally, conventional later roller designs also require a larger relief in the rib due to the support assembly being attached at the external side of the leading edge ribs.

It would therefore be highly desirable if lateral roller assemblies were provided that decreased the amount of space used in the fixed wing leading edge ribs while still providing the necessary lateral support and guiding functionality for the associated slat track. It is towards providing such a need that the embodiments disclosed herein are directed.

SUMMARY

The embodiments disclosed herein include pairs of opposed roller assemblies which decrease the amount of space used in the fixed wing leading edge ribs, each such pair of roller assemblies having opposed fixed and adjustable side roller mechanisms. Both of the fixed and adjustable side roller mechanisms include an attachment system for respective lateral roller supports through only a single hole in the wing leading edge rib structure. The rib structure can thus be used to provide a stop to guarantee the rotational position for the support or by providing a keyway in the hole itself. Alternatively, if sufficient space is available, a second hole in the rib structure may be provided so as to allow for rotational position stop in the event of a separated part.

According to certain embodiments, a slat track roller assembly is provided so as to mount a slat track operatively associated with a wing leading edge slat for movements between retracted and deployed conditions relative to a leading edge of an aircraft wing. The slat track roller assembly may include at least forward and aft pairs of roller mechanisms connected to a respective one of opposed wing ribs of the wing leading edge in operatively rolling contact with a respective opposed lateral edge of the slat track. At least one of the roller mechanisms is positionally adjustable relative to the respectively opposed lateral edge of the slat track so as to compensate for mechanical tolerances that may be present.

The positionally adjustable roller mechanism may include a roller bushing, a roller support which rotatably carries the roller bushing to allow rolling movements of the roller bushing against the respectively opposed lateral edge of the slat track, and an integral support pin having an externally threaded shank which extends laterally outwardly from the roller support through an aperture defined in the respective one of the opposed wing ribs. An adjustment pin is also provided having internal threads that are threadably engaged with the externally threaded shank of the integral support pin, and external threads that are opposite hand to the internal threads. An anti-rotation collar is fixed to the respective one of the opposed wing ribs and including a threaded bushing that is threadably engaged with external threads of the adjustment pin. Turning movements applied to the adjustment pin in selected directions thereby allows the roller support and the roller bushing carried thereby to be moved towards and away from the respectively opposed lateral edge of the slat track.

The anti-rotation collar may comprise an integral attachment flange that is fixed to the respectively opposed lateral edge of the slat track. According to certain embodiments, the anti-rotation collar includes an integral stop flange extending outwardly therefrom so as to be positioned adjacent the roller support.

The roller support may additionally comprise a roller pin to mount the roller bushing to the roller support for rolling movements thereof. A retaining ring may be provided to removably retain the roller pin in operative connection with the roller bushing. The positionally adjustable roller mechanism further comprises a lock nut threadably engaged with a terminal end of threaded shank to positionally lock the adjustment pin.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION OF EMBODIMENTS

Figure 1:
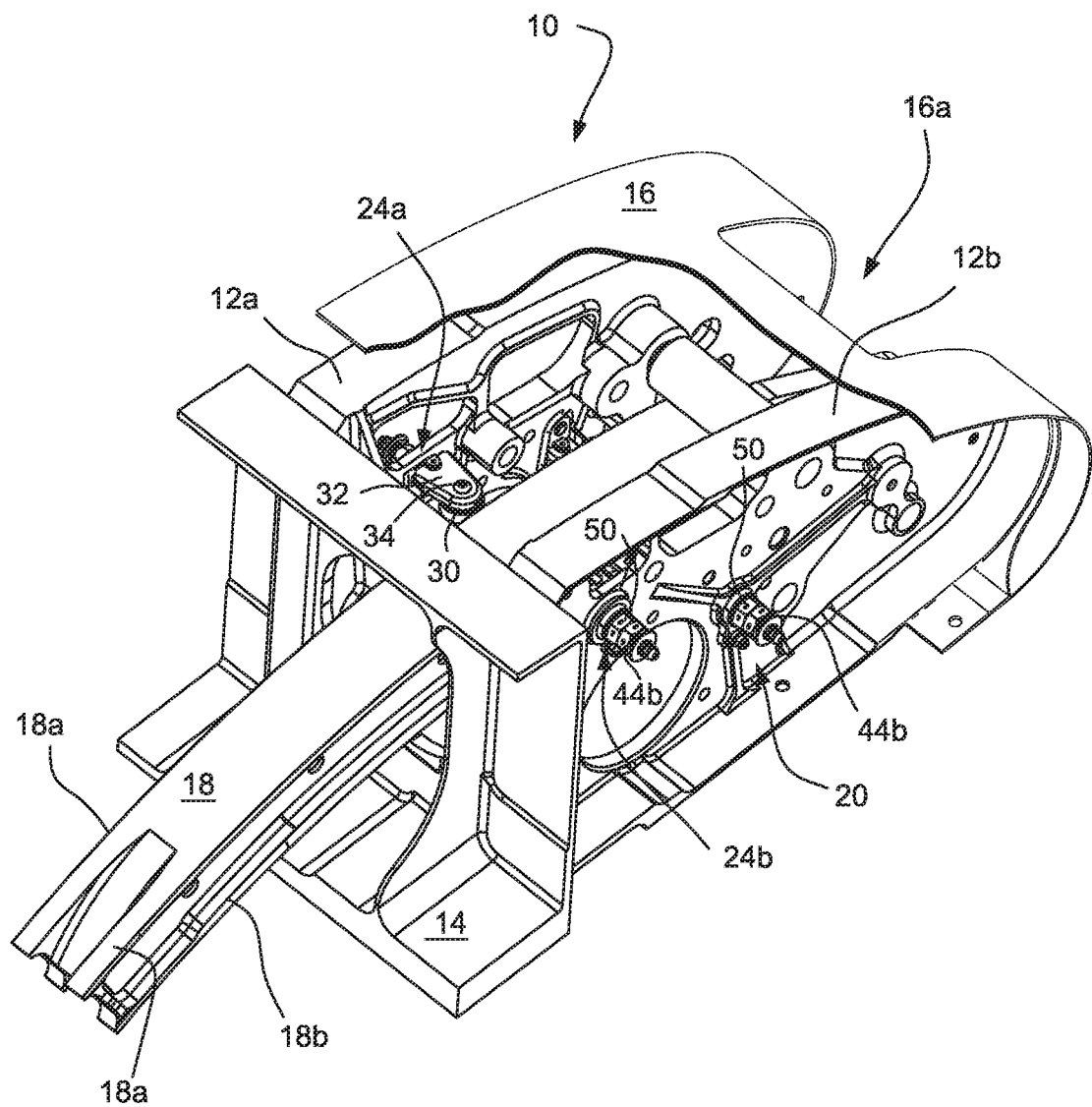
FIG. 1 is a aft perspective view of a representative section of an aircraft wing leading edge which employs the slat track roller assemblies in accordance with an embodiment of the invention.
Figure 2:
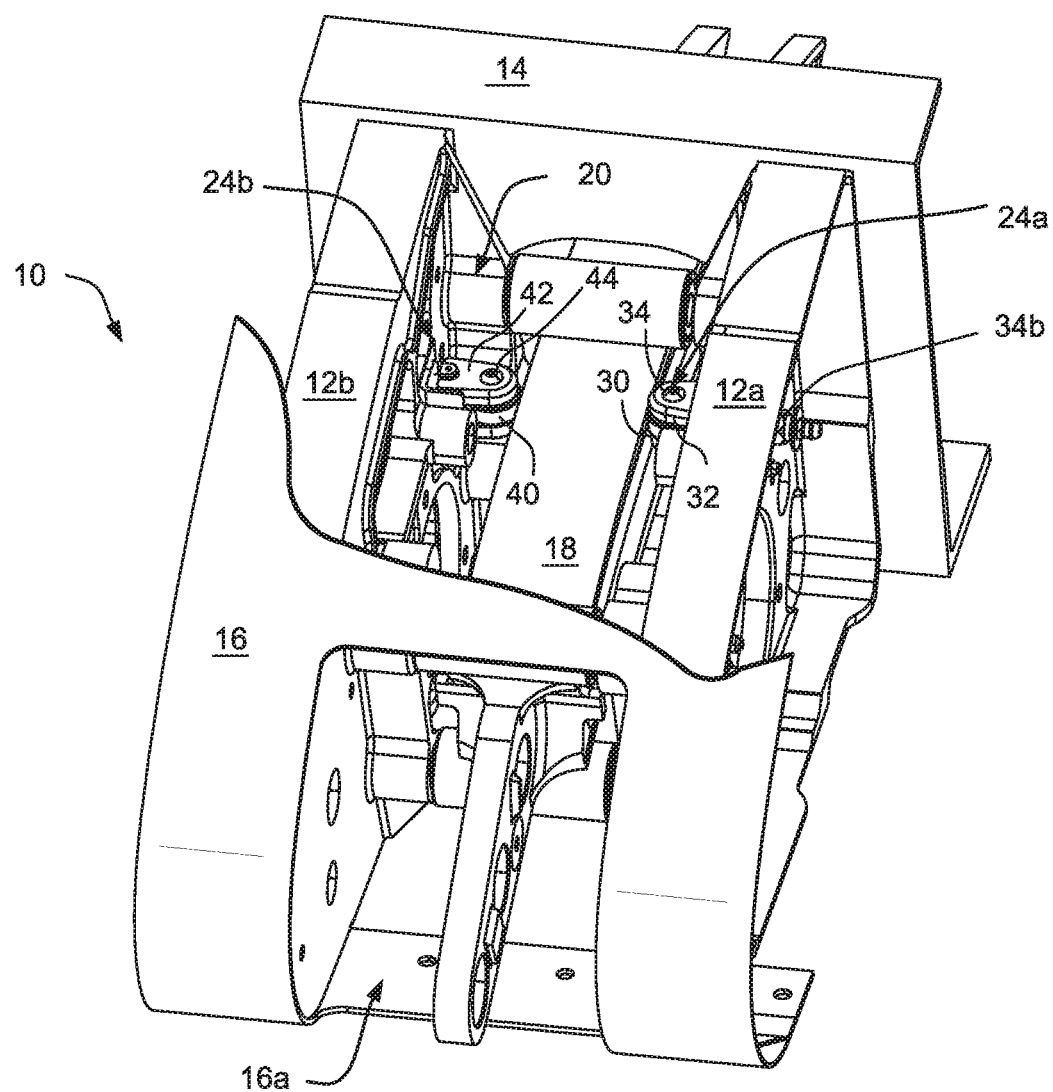
FIG. 2 is a forward perspective view of the representative aircraft wing leading edge section as shown in FIG. 1.

Accompanying FIGS. 1-5 depict a wing leading edge 10 that is provided with an inboard and outboard ribs 12a, 12b which are attached to and extend outwardly from a wing stringer 14. As is conventional, the leading edge 10 includes a skin 16 which is provided with a slat track opening 16a to allow movement of an arcuate slat track 18 operably associated with the leading edge 10 between retracted and extended positions thereof (i.e., so as to move a wing leading edge slat (not shown) between its retracted and deployed conditions, respectively, relative to the leading edge 10). The leading edge 10 is provided with a slat track roller bearing assembly 20 in accordance with an embodiment of this invention so as to facilitate the movements of the slat track 18 between its retracted and extended positions.

Figure 3:
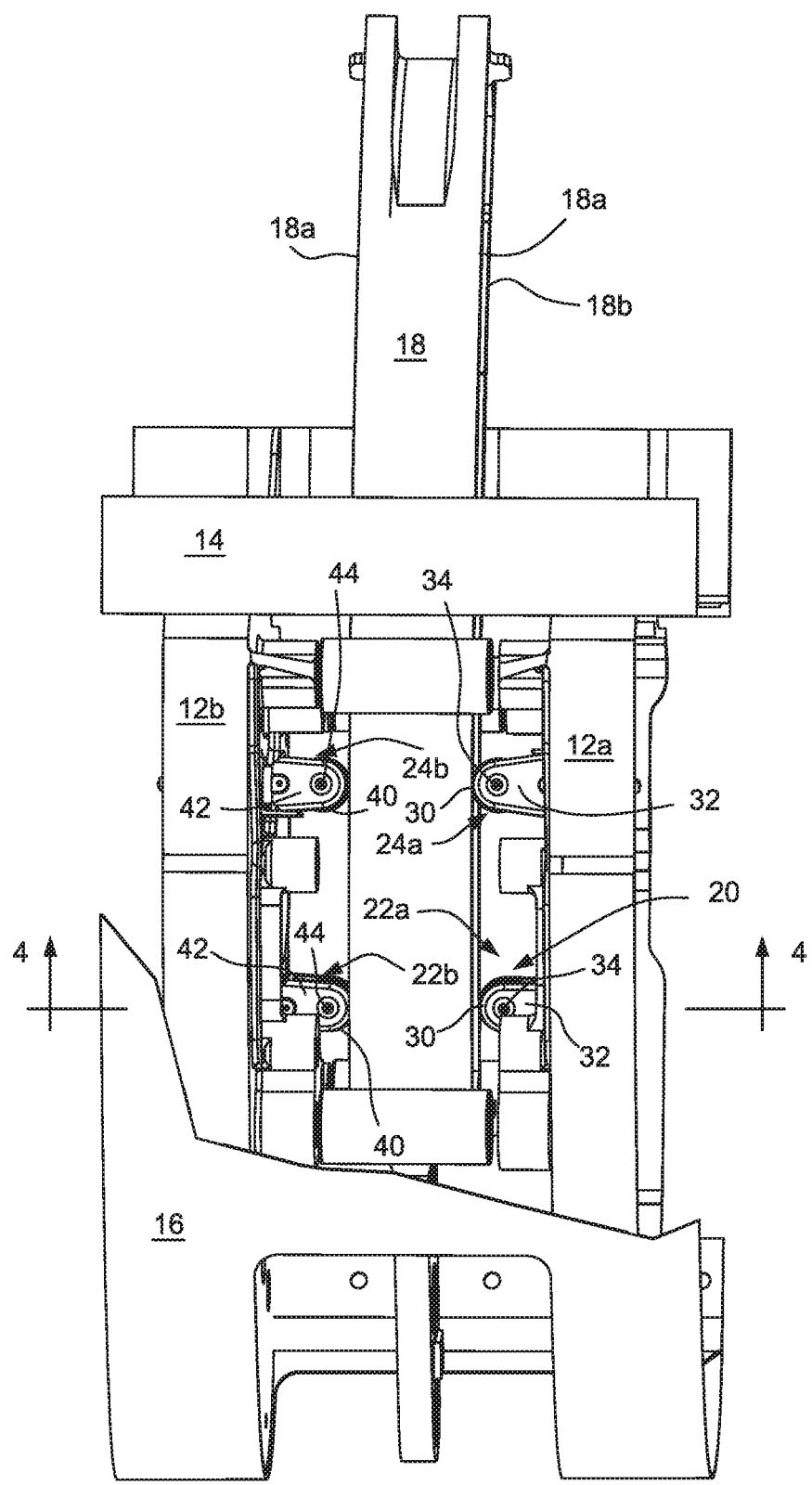
FIG. 3 is a top plan view of the representative aircraft wing leading edge section as shown in FIG. 1.
Figure 5:
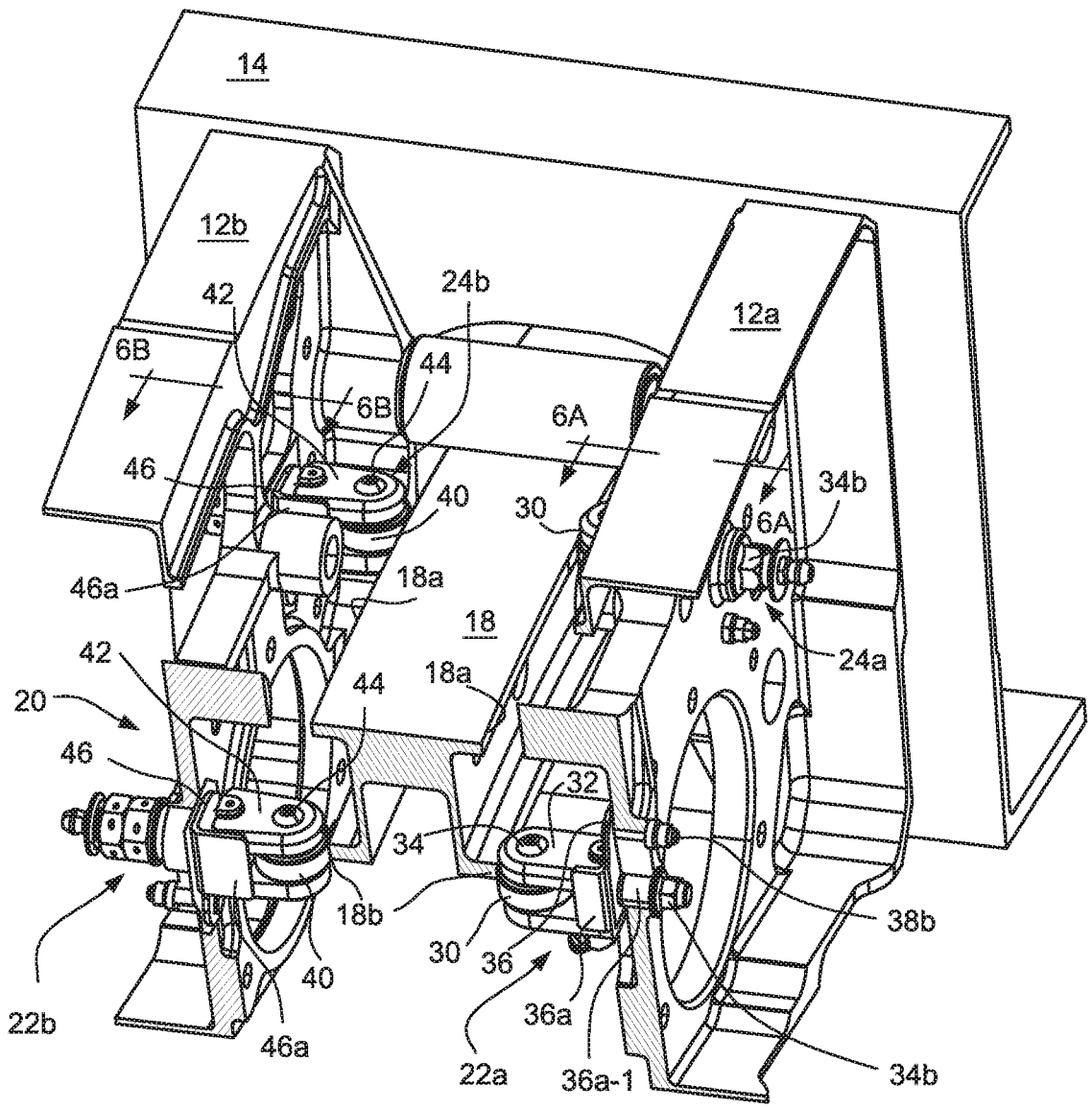
FIG. 5 is a perspective view partly sectioned of the aircraft wing leading edge section as shown in FIG. 1.

As is perhaps best shown in FIGS. 3 and 5, the slat track roller bearing assembly 20 includes forward and aft pairs of roller mechanisms 22a, 22b and 24a, 24b which are engaged with opposed lower and upper edges 18a, 18b, respectively, of the slat track 18. The roller mechanisms 22a, 24a and 22b, 24b are attached to the inboard and outboard ribs 12a, 12b, respectively, with the roller mechanisms 22a, 24a being positionally fixed mechanisms while the roller mechanisms 22b, 24b are positionally adjustable mechanisms.

Figure 4:
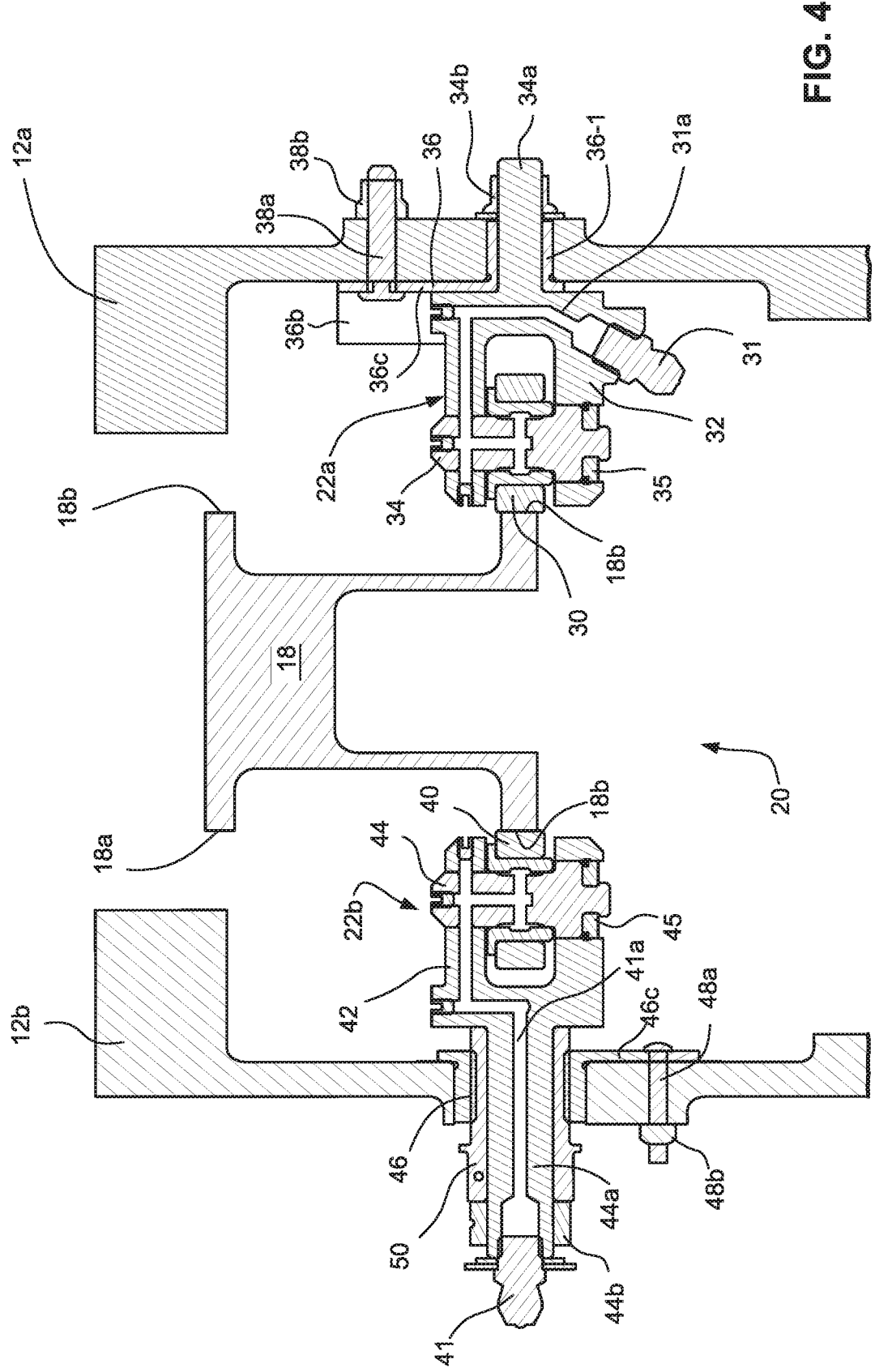
FIG. 4 is a cross-sectional elevational view of the representative aircraft wing leading edge section as taken along lines 4-4 in FIG. 3.
Figure 6A:
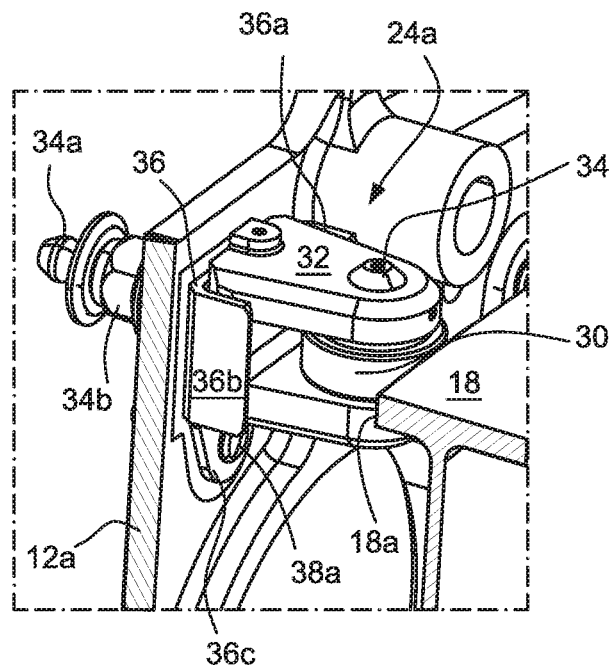
FIGS. 6A and 6B are enlarged detail perspective views of the fixed and adjustable roller bearing mechanisms associated with the slat track roller assembly as taken along lines 6A-6A and 6B-6B in FIG. 5, respectively.
Figure 6B:
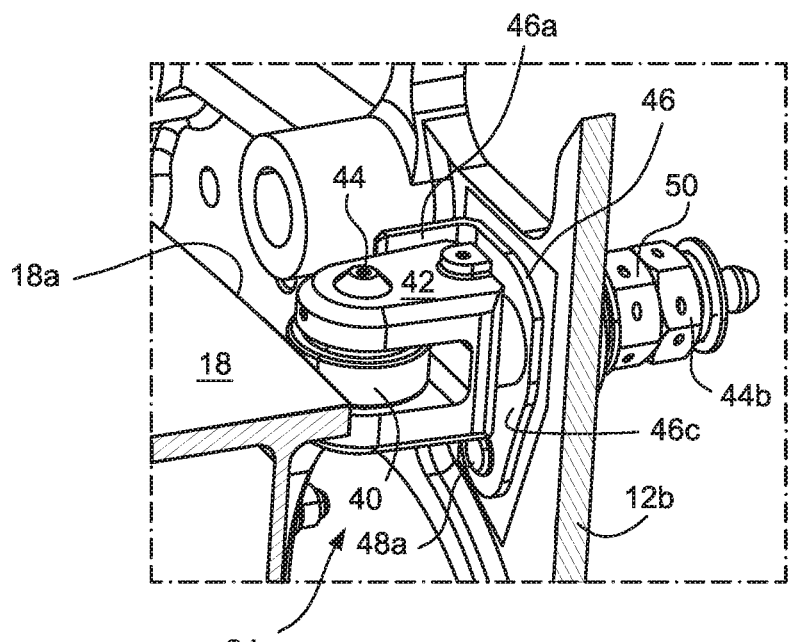

The component structures of the positionally fixed roller mechanisms 22a, 24a and the positionally adjustable roller mechanisms 22b, 24b are shown in greater detail in accompanying FIGS. 4, 6A and 6B. In this regard, FIG. 4 shows the pair of positionally fixed and adjustable roller mechanisms 22a, 22b, respectively, while FIG. 6A depicts an enlarged view of the positionally fixed roller mechanism 24a and FIG. 6B depicts an enlarged view of the positionally adjustable roller mechanism 24b. It will be appreciated that the discussion with respect to the positionally fixed and adjustable roller mechanism 24a and 24b are equally applicable to the positionally fixed and adjustable roller mechanisms 22a, 22b. Thus, for ease of description, the roller mechanisms 24a, 24b as shown in greater detail in FIGS. 6A and 6B will be discussed below with parenthetical references to roller mechanisms 22a, 22b, respectively, as shown in FIG. 4.

The fixed roller mechanism 24a (22a) includes a roller bushing 30 which is rotationally secured to a U-shaped roller support 32 by a roller pin 34. The roller pin 34 is removably secured to the support 32 by a retaining ring 35. Removal of the retaining ring 35 thereby allows the roller pin 34 to be removed so as to in turn allow the roller bushing 30 to be replaced and/or serviced. As noted previously, the roller bushing 30 is in rolling contact with an opposed edge 18a (18b) of the slat track 18 to allow the slat track 18 to move relative to the roller mechanism 24a (22a). The roller bushing 30 may be lubricated via conventional lubrication fittings 31 and associated lubrication channels 31a formed in the roller support 34.

The roller support 34 includes an integral support pin 34a having an externally threaded shank extending laterally outwardly therefrom and through an aperture in the rib 12a. A nut 34b is threadably attached to the support pin 34a so as to positionally fix the pin 34a, and thus the roller support 34, to the wing rib 12a. An anti-rotation collar 36 includes an integral bushing 36-1 that is sleeved over the support pin 34a. Anti-rotational movement of the roller support 34 is ensured by the outwardly extending fore and aft collar stop flanges 36a, 36b which serve to capture the positional orientation of the roller support 34 therebetween. The anti-rotation collar 36 is positionally fixed to the wing rib 12a by a bolt 38a and nut 38b secured through the rib 12a and an integral attachment flange 36c of the collar 36. When fixed to the wing rig 12a, therefore, the anti-rotation collar 36 thereby provides a mechanical stop for the roller support 32 so as to eliminate rotational and axial play of the support 32 relative to the slat track edge 18a (18b).

The positionally adjustable roller mechanism 24b (22b) is provided so as to allow adjustment between the various structures to compensate for mechanical tolerances therebetween. In this regard, the roller mechanism 24b (22b) includes a roller bushing 40 which is rotationally secured to a U-shaped roller support 42 by a roller pin 44. The roller pin 44 is removably secured to the support 42 by a retaining ring 45. Removal of the retaining ring 45 thereby allows the roller pin 44 to be removed so as to in turn allow the roller bushing 40 to be replaced and/or serviced. As noted previously, the roller bushing 40 is in rolling contact with an opposed edge 18a (18b) of the slat track 18 to allow the slat track 18 to move relative to the roller mechanism 24b (22b).

The roller support 44 includes an integral support pin 44a having an externally threaded shank extending laterally outwardly therefrom and through an aperture in the rib 12b. An adjustment pin 50 is provided with internal threads that are threadably engaged with the external threads on the shank of the support pin 44a and external threads that are threadably engaged with an integral threaded bushing 46-1 associated with an anti-rotation collar 46. Preferably, the support pin 44a is provided with external left-hand threads that threadably cooperate with the internal threads of the adjustment pin 50 while the external threads of the adjustment pin 50 are standard right-hand threads that threadably cooperate with the threaded bushing 46-1 of the anti-rotation collar 46. In this manner, turning movement applied to a proximal end of the adjustment pin 50 will allow positional advancement/retraction of the distal end of the pin 50 relative to the slat track edge 18a (18b) so as to intern allow the roller mechanism 22a (22b) to be positionally adjusted relative to the slat track 18 and thereby compensate for any out of tolerance situations. Once the roller mechanism 22a (22b) is properly positioned by turning manipulation of the adjustment pin 50, a lock nut 44b may be secured onto the exposed externally threaded terminal end of the integral support pin 44. A safety wire (not shown) could also be provided to secure the lock nut 44b to the adjustment pin 50 and thereby fix the adjusted position of the roller mechanism 22a (22b).

Anti-rotational movement of the roller support 44 is ensured by an outwardly extending stop flange 46a. The anti-rotation collar 46 is positionally fixed to the wing rib 12b by a bolt 48a and nut 48b secured through the rib 12b and an integral attachment flange 46c of the collar 46. When fixed to the wing rib 12b, therefore, the stop flange 46l of the anti-rotation collar 46 thereby provides a mechanical stop for the roller support 42 so as to eliminate rotational and axial play of the support 42 relative to the slat track edge 18a (18b).

The roller bushing 40 may be lubricated via a conventional lubrication fitting 41 and associated lubrication channels 41a formed in the roller support 44 and the integral pin 44a thereof.

While reference is made to a particular embodiment of the invention, various modifications within the skill of those in the art may be envisioned. Therefore, it is to be understood that the invention is not to be limited to the disclosed embodiment, but on the contrary, is intended to cover various modifications and equivalent arrangements included within the spirit and scope thereof.

What is claimed is:

1. An aircraft wing comprising:
    a plurality of wing ribs which define a wing leading edge,
    a wing leading edge slat having a slat track, and
    a slat track roller assembly for mounting the slat track to the aircraft wing to allow movements of the wing leading edge slat between retracted and deployed conditions relative to the pleading edge of the aircraft wing, wherein
    the slat track roller assembly comprises:
        at least forward and aft pairs of roller mechanisms each connected to a respective one of an opposed pair of the wing ribs of the wing leading edge in operative rolling contact with a respective opposed lateral edge of the slat track, wherein
        at least one of the roller mechanisms is positionally adjustable relative to the respectively opposed lateral edge of the slat track and includes:
            a roller bushing;
            a roller support which rotatably carries the roller bushing to allow rolling movements of the roller bushing against the respectively opposed lateral edge of the slat track;
            an integral support pin having an externally threaded shank which extends laterally outwardly from the roller support through an aperture defined in the respective one of the opposed pair of the wing ribs;
            an adjustment pin having internal threads that are threadably engaged with the externally threaded shank of the integral support pin, and external threads that are opposite hand to the internal threads; and
            an anti-rotation collar fixed to the respective one of the opposed pair of the wing ribs, the anti-rotation collar including a threaded bushing that is threadably engaged with external threads of the adjustment pin, wherein
            turning movements of the adjustment pin in selected directions allows the roller support and the roller bushing carried thereby to be moved towards and away from the respectively opposed lateral edge of the slat track.

2. The aircraft wing according to claim 1, wherein the anti-rotation collar comprises an integral attachment flange that is fixed to the respectively opposed lateral edge of the slat track.

3. The aircraft wing according to claim 1, wherein the roller support comprises a roller pin to mount the roller bushing to the roller support for rolling movements thereof.

4. The aircraft wing according to claim 3, wherein the roller support comprises a retaining ring for removably retaining the roller pin in operative connection with the roller bushing.

5. The aircraft wing according to claim 1, wherein the positionally adjustable roller mechanism further comprises a lock nut threadably engaged with a terminal end of threaded shank to positionally lock the adjustment pin.

6. The aircraft wing according to claim 1, wherein the anti-rotation collar includes an integral stop flange extending outwardly therefrom so as to be positioned adjacent the roller support.

7. The aircraft wing according to claim 1, wherein the roller support comprises lubricating channels.

8. The aircraft wing according to claim 7, wherein the roller support comprises a lubricating fitting communicating with the lubricating channels.

9. An aircraft which comprises the aircraft wing according to claim 1.

10. The aircraft wing according to claim 1, wherein at least another of the roller mechanisms is positionally fixed relative to the respective one of the opposed wing ribs, wherein the positionally fixed roller mechanism comprises:
    a second roller bushing;
    a second roller support which rotatably carries the second roller bushing to allow rolling movements of the second roller bushing against the respectively opposed lateral edge of the slat track;
    an integral second support pin having an externally threaded shank which extends laterally outwardly from the second roller support through an aperture defined in the respective one of the opposed wing ribs and having a nut threadably engaged therewith to positionally fix the second roller support relative to the respective one of the opposed wing ribs; and
    a second anti-rotation collar fixed to the respective one of the opposed wing ribs.

11. The aircraft wing according to claim 10, wherein the second anti-rotation collar comprises an integral second attachment flange that is fixed to the respectively opposed lateral edge of the slat track.

12. The aircraft wing according to claim 10, wherein the second roller support comprises a second roller pin to mount the second roller bushing to the second roller support for rolling movements thereof.

13. The aircraft wing according to claim 12, wherein the second roller support comprises a second retaining ring for removably retaining the second roller pin in operative connection with the second roller bushing.

14. The aircraft wing according to claim 10, wherein the second anti-rotation collar includes integral forward and aft stop flanges extending outwardly therefrom so as to be positioned adjacent a forward and aft portion of the second roller support.

15. The aircraft wing according to claim 10, wherein the second roller support comprises lubricating channels.

16. The aircraft wing according to claim 15, wherein the second roller support comprises a lubricating fitting communicating with the lubricating channels.

17. An aircraft which comprises the aircraft wing according to claim 10.

\* \* \* \* \*